United States Patent
Kim et al.

(10) Patent No.: US 10,153,924 B2
(45) Date of Patent: Dec. 11, 2018

(54) METHOD FOR PERFORMING SELF-INTERFERENCE CANCELLATION BY COMMUNICATION DEVICE USING FDR MODE

(71) Applicant: LG ELECTRONICS INC., Seoul (KR)

(72) Inventors: Dongkyu Kim, Seoul (KR); Hyunsoo Ko, Seoul (KR); Kwangseok Noh, Seoul (KR); Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/578,135

(22) PCT Filed: Jan. 27, 2016

(86) PCT No.: PCT/KR2016/000845
§ 371 (c)(1),
(2) Date: Nov. 29, 2017

(87) PCT Pub. No.: WO2016/195204
PCT Pub. Date: Dec. 8, 2016

(65) Prior Publication Data
US 2018/0152329 A1 May 31, 2018

Related U.S. Application Data

(60) Provisional application No. 62/168,916, filed on Jun. 1, 2015.

(51) Int. Cl.
*H04L 25/03* (2006.01)
*H04L 25/02* (2006.01)
(Continued)

(52) U.S. Cl.
CPC ......... *H04L 25/03821* (2013.01); *H04B 3/32* (2013.01); *H04J 11/0063* (2013.01);
(Continued)

(58) Field of Classification Search
CPC .......... H04L 25/03821; H04L 25/0328; H04L 25/03305; H04L 25/02; H04L 25/03; H04L 27/261; H04B 3/32; H04J 11/0063
See application file for complete search history.

(56) References Cited

U.S. PATENT DOCUMENTS

| 2014/0099908 A1* | 4/2014 | Bornazyan | H04B 1/1036 455/303 |
| 2015/0009868 A1 | 1/2015 | Jana et al. | |

(Continued)

FOREIGN PATENT DOCUMENTS

JP 2014236489 A 12/2014

*Primary Examiner* — Syed Haider
(74) *Attorney, Agent, or Firm* — Dentons US LLP

(57) ABSTRACT

A method for performing self-interference cancellation by a communication device which uses an FDR mode can comprise the steps of: measuring the strength of a residual self-interference signal, after antenna and analog self-interference cancellation, for each subband with respect to a predetermined number of subbands configured in a communication device; determining the order of a nonlinear self-interference signal component, to be considered for channel estimation of a nonlinear self-interference signal, for each subband on the basis of the strength of the residual self-interference signal that has been measured for each subband; and performing channel estimation of the nonlinear self-interference signal on the basis of the order that has been determined for each subband.

13 Claims, 15 Drawing Sheets

(51) Int. Cl.
*H04L 27/26* (2006.01)
*H04B 3/32* (2006.01)
*H04J 11/00* (2006.01)

(52) U.S. Cl.
CPC .............. *H04L 25/02* (2013.01); *H04L 25/03* (2013.01); *H04L 25/0328* (2013.01); *H04L 25/03305* (2013.01); *H04L 27/2691* (2013.01); *H04L 27/261* (2013.01)

(56) References Cited

U.S. PATENT DOCUMENTS

| | | | |
|---|---|---|---|
| 2015/0043323 A1* | 2/2015 | Choi | H04L 5/143 370/203 |
| 2015/0065058 A1 | 3/2015 | Wang et al. | |
| 2015/0126146 A1* | 5/2015 | Wang | H04B 1/1027 455/296 |

* cited by examiner

FIG. 8
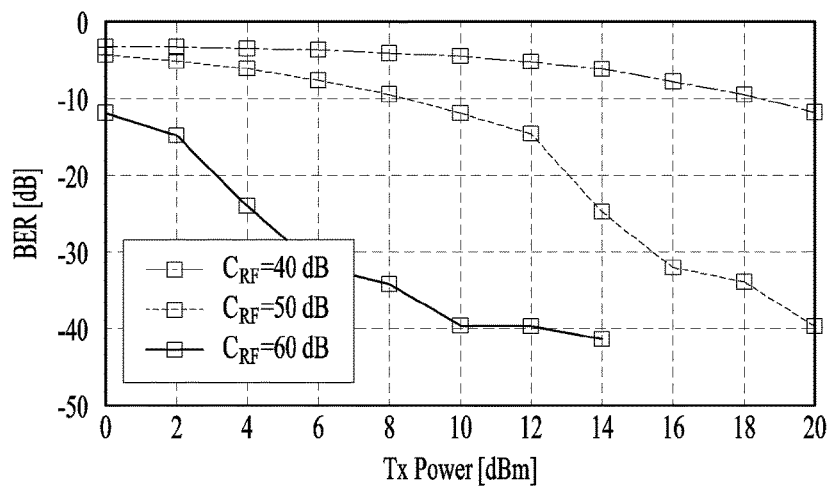
(a) 5dB isolation degradation
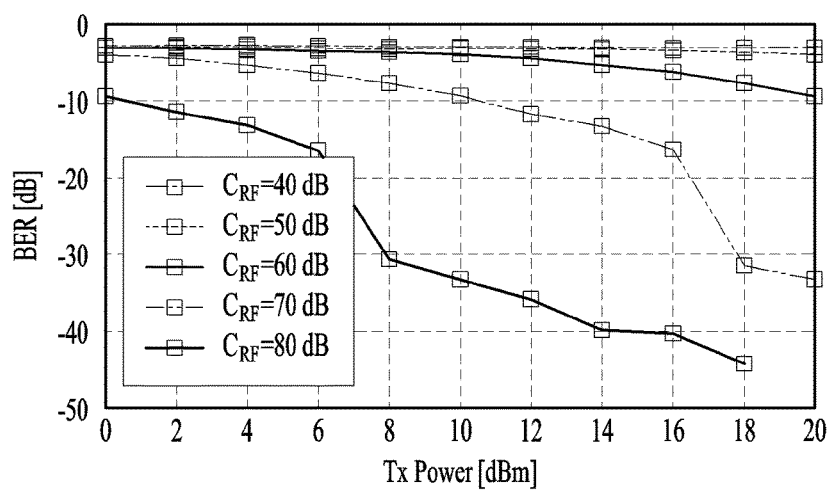
(b) 15dB isolation degradation

METHOD FOR PERFORMING SELF-INTERFERENCE CANCELLATION BY COMMUNICATION DEVICE USING FDR MODE This application is the National Phase of PCT International Application No. PCT/KR2016/000845, filed on Jan. 27, 2016, which claims priorities under 35 U.S.C. 119(e) to U.S. Provisional Application No. 62/168,916, filed on Jun. 1, 2015, which are hereby incorporated by reference herein in their entirety.

TECHNICAL FIELD

The present disclosure relates to wireless communication, and more particularly, to a method for performing self-interference cancellation in a communication apparatus using full duplex radio (FDR).

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a user equipment (UE) and a base station (BS) which support full duplex radio (FUR).

In the FDR situation illustrated in FIG. 1, the following three types of interference are produced.

Intra-apparatus self-interference: Because transmission and reception take place in the same time and frequency resources, a desired signal and a signal transmitted from a BS or UE are received at the same time at the BS or UE. The transmitted signal is received with almost no attenuation at a reception (Rx) antenna of the BS or UE, and thus with much larger power than the desired signal. As a result, the transmitted signal serves as interference.

UE to UE inter-link interference: An uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-apparatus self-interference (hereinafter, self-interference (SI)) is generated only in an FDR system to significantly deteriorate performance of the FDR system. Therefore, first of all, intra-apparatus SI needs to be cancelled in order to operate the FDR system.

DISCLOSURE

Technical Problem

An aspect of the present disclosure devised to solve the conventional problem is to provide a method for performing self-interference cancellation in a communication apparatus using full duplex radio (FDR).

Another aspect of the present disclosure is to provide an apparatus for performing self-interference cancellation in an FDR environment.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for performing self-interference cancellation in a communication apparatus using full duplex radio (FDR) scheme includes measuring a strength of a residual self-interference signal after antenna and analog self-interference cancellations, in each of a predetermined number of subbands, determining an order of a non-linear self-interference signal component to be considered for channel estimation of a non-linear self-interference signal in each subband based on the measured strength of the residual self-interference signal in each subband, and performing channel estimation on the non-linear self-interference signal according to the order determined for each subband. The orders determined for the respective subbands may be different. Each subband may have different bandwidth or the same bandwidth. The number of subbands may be predetermined based on frequency selectivity of the residual self-interference signal. The number of subbands may be predetermined based on an absolute value of the strength of the residual self-interference signal after the antenna self-interference cancellation and analog self-interference cancellation. The number of subbands may be predetermined based on an absolute value of the strength of the residual self-interference signal after the antenna self-interference cancellation and analog self-interference cancellation and a predetermined margin value for the strength of the residual self-interference signal.

In another aspect of the present disclosure, a communication apparatus for performing self-interference cancellation in an FDR environment includes a processor configured to measure a strength of a residual self-interference signal after antenna self-interference cancellation and analog self-interference cancellation, in each of a predetermined number of subbands, to determine an order of a non-linear self-interference signal component to be considered for channel estimation of a non-linear self-interference signal in each subband based on the measured strength of the residual self-interference signal in the subband, and to perform channel estimation on the non-linear self-interference signal according to the order determined for each subband. The processor may be configured to predetermine the number of subbands based on frequency selectivity of the residual self-interference signal. The processor may be configured to predetermine the number of subbands based on an absolute value of the strength of the residual self-interference signal after the antenna self-interference cancellation and analog self-interference cancellation. The processor may be configured to predetermine the number of subbands based on an absolute value of the strength of the residual self-interference signal after the antenna self-interference cancellation and analog self-interference cancellation and a predetermined margin value for the strength of the residual self-interference signal.

Advantageous Effects

Since an FDR transmission/reception system considers the frequency selectivity of a residual self-interference signal caused by the performance characteristics of antenna self-interference cancellation and analog self-interference cancellation, the FDR transmission/reception system can perform digital self-interference cancellation stably.

Further, residual self-interference can be cancelled efficiently by performing non-linear self-interference channel estimation of a different order for each subband.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 8 is a view illustrating BER performance, when digital Self-IC is performed after analog Self-IC using Baluns having isolation degradation of 5 dB and 15 dB.

BEST MODE FOR CARRYING OUT THE INVENTION

Figure 1:
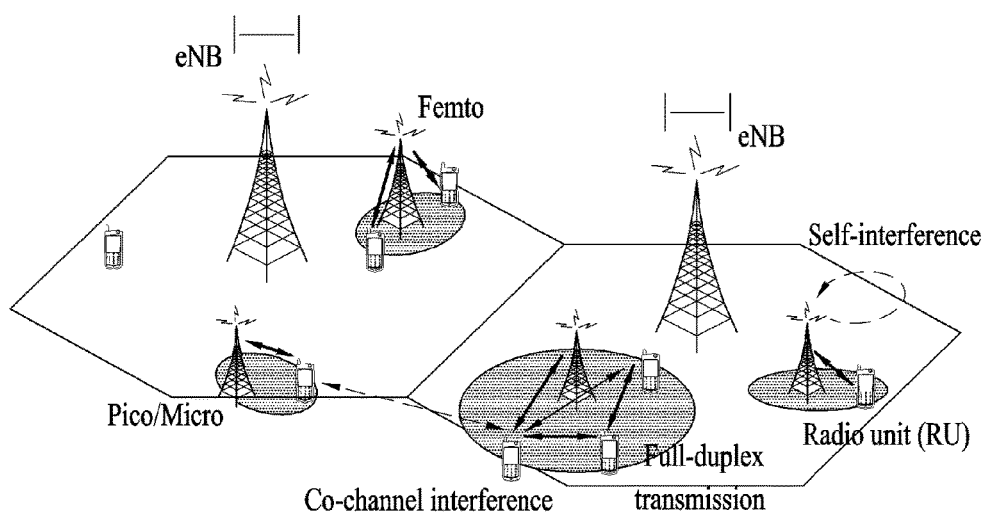
FIG. 1 is a view illustrating an exemplary network supporting a full/half duplex communication operation mode of a user equipment (UE) according to the present disclosure.

Reference will now be made in detail to the preferred embodiments of the present disclosure, examples of which are illustrated in the accompanying drawings. In the following detailed description of the invention includes details to help the full understanding of the present disclosure. Yet, it is apparent to those skilled in the art that the present disclosure can be implemented without these details. For instance, although the following descriptions are made in detail on the assumption that a mobile communication system includes a 3rd Generation Partnership Project (3GPP) long term evolution (LTE) system, the following descriptions are applicable to other random mobile communication systems in a manner of excluding unique features of the 3GPP LTE.

Occasionally, to prevent the present disclosure from getting vaguer, structures and/or apparatuses known to the public are skipped or can be represented as block diagrams centering on the core functions of the structures and/or apparatuses. Wherever possible, the same reference numbers will be used throughout the drawings to refer to the same or like parts.

Besides, in the following description, assume that a terminal is a common name of such a mobile or fixed user stage apparatus as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a UE is able to receive information in downlink (DL) and is able to transmit information in uplink (UL) as well. Information transmitted or received by the UE node may include various kinds of data and control information. In accordance with types and usages of the information transmitted or received by the UE, various physical channels may exist.

The following descriptions are usable for various wireless access systems including code division multiple access (CDMA), frequency division multiple access (FDMA), time division multiple access (TDMA), orthogonal frequency division multiple access (OFDMA), single carrier frequency division multiple access (SC-FDMA) and the like. CDMA can be implemented by such a radio technology as universal terrestrial radio access (UTRA), CDMA 2000 and the like. TDMA can be implemented with such a radio technology as global system for mobile communications/general packet radio service/enhanced data rates for GSM evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS). 3GPP LTE is a part of evolved UMTS (E-UMTS) that uses E-UTRA. The 3GPP LTE employs OFDMA in DL and SC-FDMA in UL. And, LTE-advanced (LTE-A) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
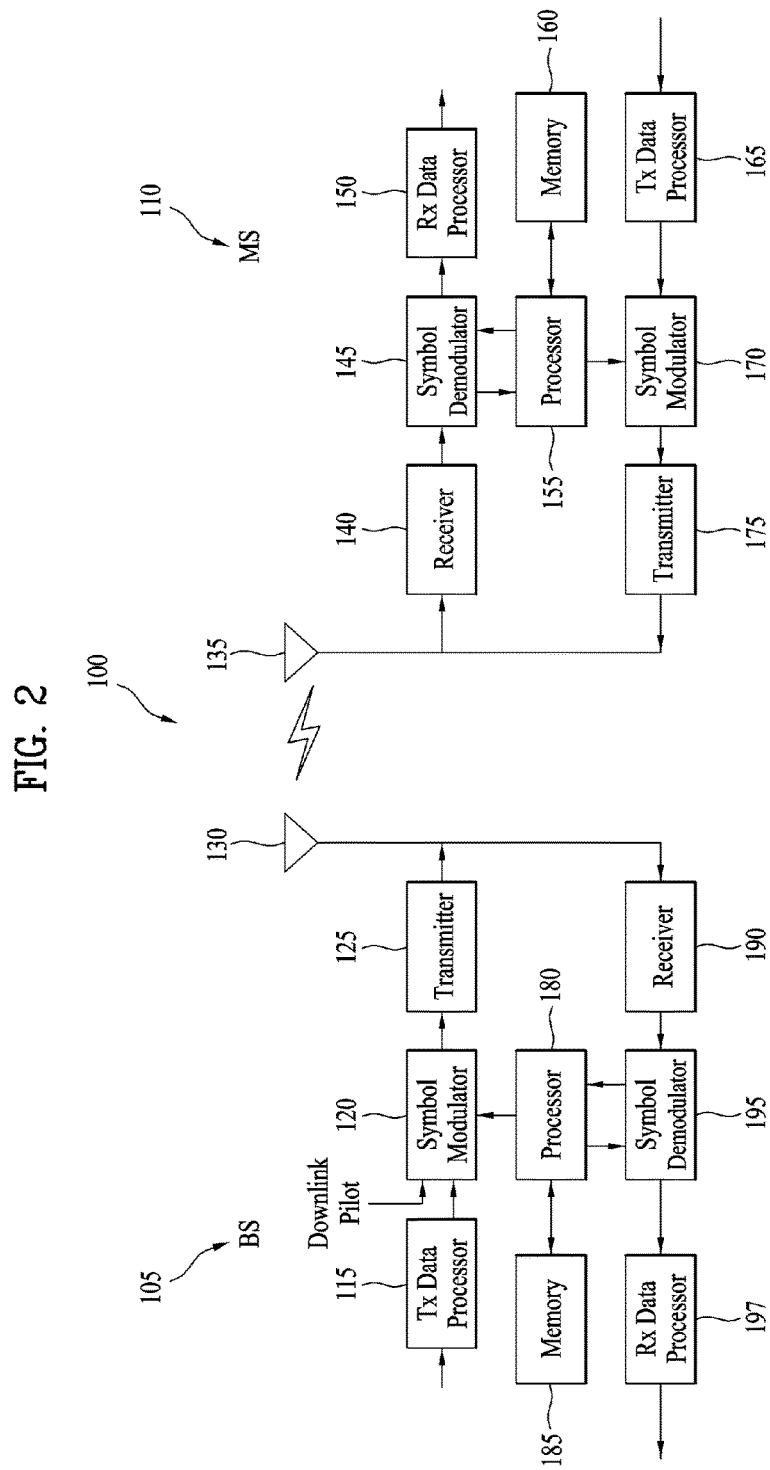
FIG. 2 is a block diagram of a base station (BS) 105 and a UE 110 in a wireless communication system 100.

FIG. 2 is a block diagram of a BS 105 and a UE 110 in a wireless communication system 100.

Although one BS 105 and one UE 110 (device-to-device (D2D) UE included) are shown in the drawing to schematically represent a wireless communication system 100, the wireless communication system 100 may include at least one BS and/or at least one UE.

Referring to FIG. 2, a BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a multiple input multiple output (MIMO) system. And, the BS 105 according to the present invention may support both single user-MIMO (SU-MIMO) and multi user-MIMO (MU-MIMO) systems.

In DL, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconversion), and then generates a DL signal suitable for a transmission on a radio channel Subsequently, the DL signal is transmitted to the UE via the antenna 130.

In the configuration of the UE 110, the receiving antenna 135 receives the DL signal from the BS and then provides the received signal to the receiver 140. The receiver 140 adjusts the received signal (e.g., filtering, amplification and frequency downconversion), digitizes the adjusted signal, and then obtains samples. The symbol demodulator 145 demodulates the received pilot symbols and then provides them to the processor 155 for channel estimation.

The symbol demodulator 145 receives a frequency response estimated value for DL from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the BS 105, respectively.

In the UE 110 in UL, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the UE/BS 110/105 directs operations (e.g., control, adjustment, management, etc.) of the UE/BS 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as application specific integrated circuits (ASICs), digital signal processors (DSPs), digital signal processing devices (DSPDs), programmable logic devices (PLDs), field programmable gate arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a UE/BS and a wireless communication system (network) may be classified into 1st layer L1, 2nd layer L2 and 3rd layer L3 based on 3 lower layers of open system interconnection (OSI) model well known to communication systems. A physical layer belongs to the 1st layer and provides an information transfer service via a physical channel Radio resource control (RRC) layer belongs to the 3rd layer and provides control radio resourced between UE and network. A UE and a BS may be able to exchange RRC messages with each other through a wireless communication network and RRC layers.

In the present specification, although the processor 155/180 of the UE/BS performs an operation of processing signals and data except a function for the UE/BS 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
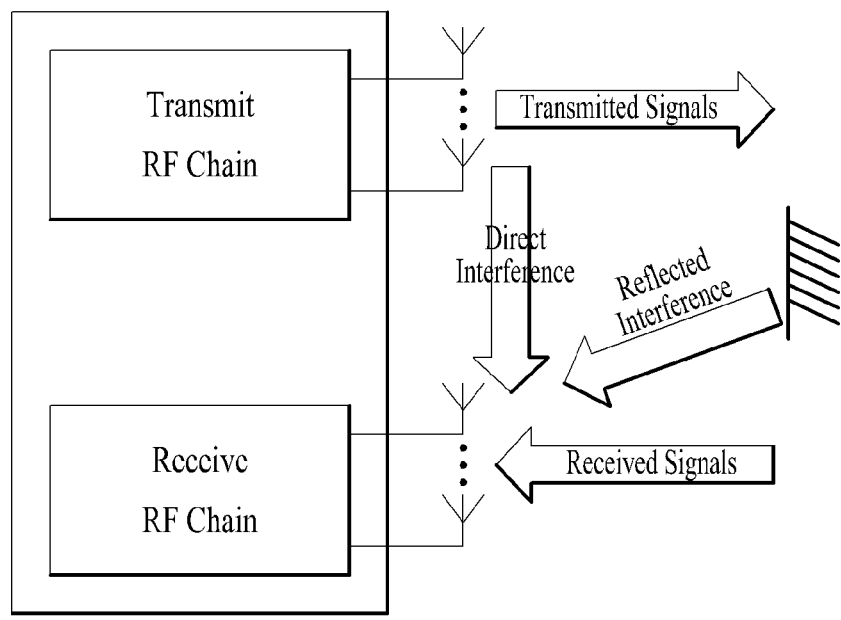
FIG. 3 is a conceptual view illustrating a transmission/reception link and self-interference (SI) in a full duplex radio (FDR) communication situation.

FIG. 3 is a conceptual view illustrating a transmission/reception link and self-interference (SI) in a full duplex radio (FDR) communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of apparatuses (in the case where FDR is applied to a mobile communication system (BW=20 MHz)) may be determined as illustrated in Table 1 below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
| --- | --- | --- | --- | --- | --- |
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{0,BW}$=−174 dBm+10×$\log_{10}$(BW) according to the BW of a mobile communication system. In [Table 1], the thermal noise value is calculated on the assumption of a 20-MHz BW. In relation to [Table 1], for a receiver noise figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
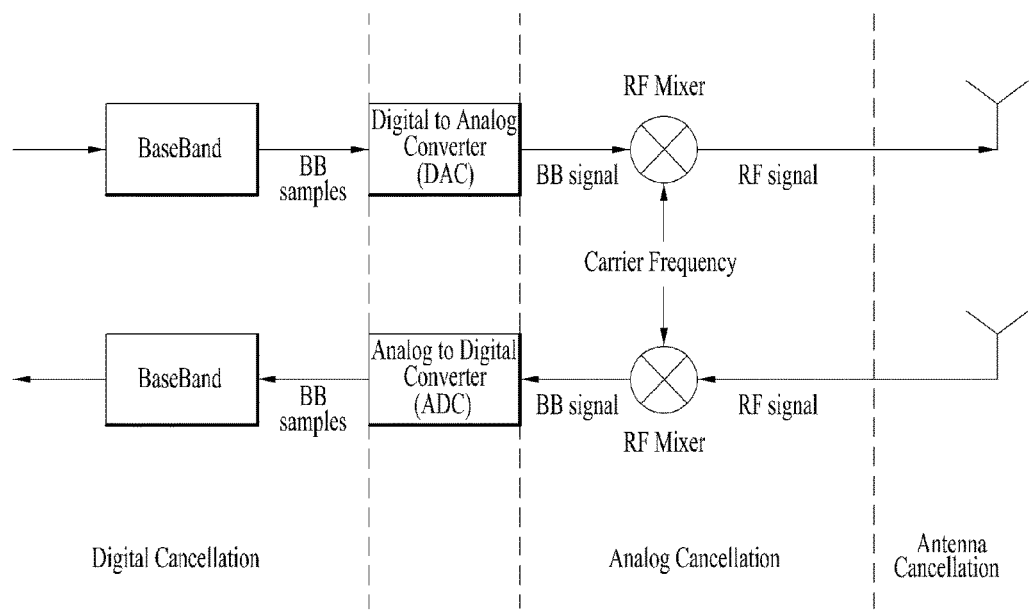
FIG. 4 is a view illustrating positions to which three cancellation schemes are applied at a radio frequency (RF) transmission and reception end (or RF front end) of an apparatus.

FIG. 4 is a view illustrating positions to which three cancellation schemes are applied at a radio frequency (RF) transmission and reception end (or RF front end) of an apparatus. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before Rx signal passes through an Analog-to-Digital Convertor (ADC). An SI signal is canceled using a duplicated analog signal. This operation may be performed in an RF region or an intermediate frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or a BS may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
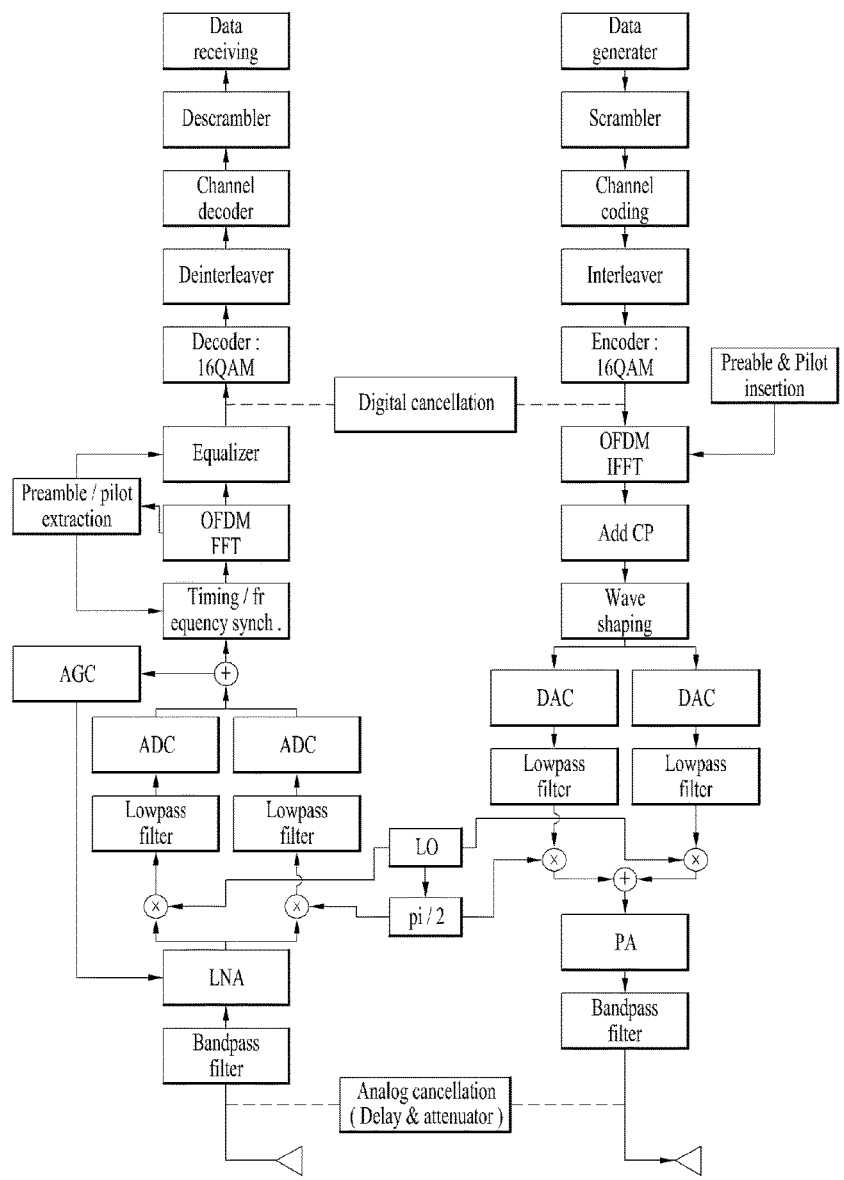
FIG. 5 is a block diagram of an apparatus for performing self-interference cancellation (Self-IC) in a communication apparatus proposed based on FIG. 4 in a communication system environment using orthogonal frequency division multiplexing (OFDM).

FIG. 5 is a block diagram of an apparatus for performing self-interference cancellation (Self-IC) in a communication apparatus proposed based on FIG. 4 in a communication system environment using OFDM.

While FIG. 5 shows that digital Self-IC is performed using digital SI information before digital to analog Conversion (DAC) and after ADC, it may be performed using a digital SI signal after inverse fast Fourier transform (IFFT) and before fast Fourier transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

The present disclosure proposes a signaling technique for performing non-linear digital Self-IC of a different order on a subband basis in order to enable stable digital Self-IC in consideration of the frequency selectivity of a residual SI signal caused by antenna/analog Self-IC performance characteristics in an FDR Tx/Rx system.

Signal Modeling in FDR System

Since an FDR system uses the same frequency between a transmitted signal and a received signal, non-linear components in an RF signal have significant influence. In particular, a transmitted signal is distorted by non-linear properties of active elements such as a power amplifier (PA) and a low noise amplifier (LNA), and, due to such distortion, the transmitted signal may be modeled as generation of a component corresponding to a high order. A component corresponding to an even order has influence on the vicinity of DC and thus may be efficiently cancelled using an existing AC coupling or filtering scheme. However, a component corresponding to an odd order is generated in the vicinity of a center frequency and thus cannot be easily cancelled unlike the even order, thereby having significant influence on reception. In consideration of the non-linear properties of the odd order, a received signal subjected to ADC in an FDR system may be expressed using the Parallel Hammerstein (PH) model as shown in [Equation 1] below.

$$y(n) = \\ h_D(n) * x_D(n) + \sum_{\substack{k=1,\ldots,K \\ k=odd}} h_{SI,k}(n) * |x_{SI}(n)|^{k-1} x_{SI}(n) + z(n)$$

[Equation 1]

Herein, (n) denotes data to be received by an RF end of an apparatus, $h_D$ (n) denotes a desired channel experienced by data to be received, $x_{SI}$(n) denotes data transmitted by the RF end of the apparatus, $h_{SI,k}$(n) denotes a self-interference channel experienced by data transmitted by the RF end of the apparatus, which is a linear component if k is 1 and is a nonlinear component if k is an odd number of 3 or more and z(n) denotes additive white Gaussian noise (AWGN).

Various combinations of antenna/analog/digital Self-IC are essential to achieve Self-IC performance required for operation of a feasible FDR system. In general, each Self-IC scheme needs to be matched in order to achieve Self-IC performance based on schemes in various domains. Analog Self-IC needs to be designed in the analog domain according to the performance of antenna Self-IC in the antenna domain. Then, digital Self-IC needs to be designed in the digital domain according to the performance of antenna/analog Self-IC in the antenna/analog domain.

Figure 6:
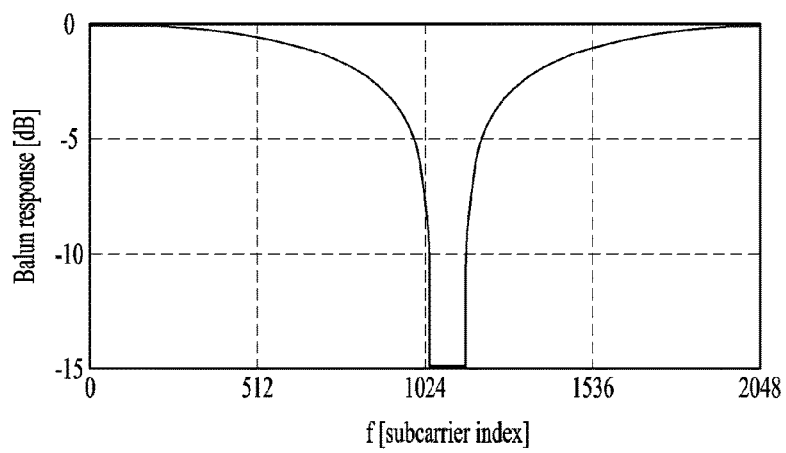
FIG. 6 is a view illustrating Balun frequency responses.

For example, if a Balun is used for analog Self-IC in an FDR system, Balun frequency responses are frequency selective as illustrated in FIG. 6.

FIG. 6 is a view illustrating Balun frequency responses.

Referring to FIG. 6, Balun frequency responses have a difference of 15 dB at maximum according to subcarrier indexes. Herein, a frequency-selective residual SI signal after analog Self-IC using a Balun degrades the performance of digital Self-IC, and the performance is illustrated in FIGS. 7 and 8.

Figure 7:
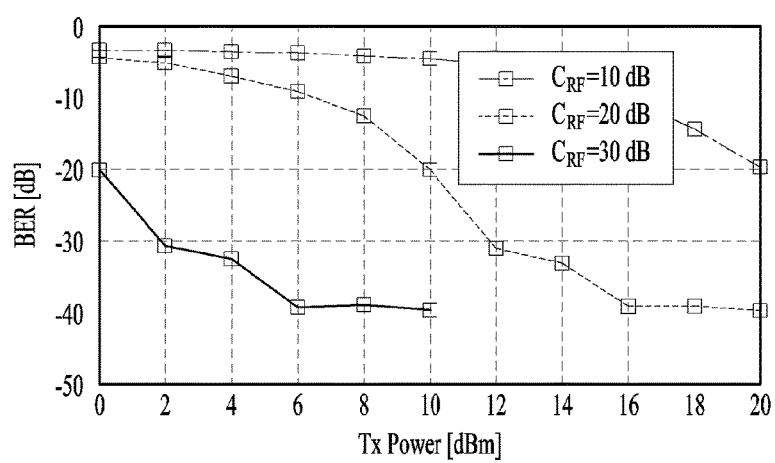
FIG. 7 is a view illustrating bit error rate (BER) performance, when digital Self-IC is performed after analog Self-IC using a Balun having ideal performance.

FIG. 7 is a view illustrating BER performance, when digital Self-IC is performance after analog Self-IC using a Balun having ideal performance, and FIG. 8 is a view illustrating BER performance, when digital Self-IC is performed after analog Self-IC using Baluns having isolation degradation of 5 dB and 15 dB.

The three graphs illustrated in FIGS. 7 and 8 are compared as follows. First, the graph related to analog Self-IC using a Balun having ideal (frequency-flat) frequency response characteristics reveals that if analog Self-IC is 30 dB (CRF=30 dB) and Tx power is 10 dBm, the BER performance is −40 dB. On the other hand, referring to FIG. 8, the two graphs related to analog Self-IC using Baluns having isolation degradation of 5 dB and 15 dB reveal that frequency selectivity of a residual SI signal caused by the analog Self-IC degrades Self-IC performance significantly.

It is noted from (a) of FIG. 8 that if Tx power is 10 dBm in spite of analog Self-IC of 60 dB (CRF=60B), the BER performance is lower than in the case of using the ideal Balun. It is noted from (b) of FIG. 8 that if Tx power is 10 dBm in spite of analog Self-IC of 80 dB (CRF=80B), the BER performance is lower than in the case of using the ideal Balun.

Further, even though antenna/analog Self-IC is performed using an analog Self-IC scheme that generates a reference signal (RS) using various combinations between a rat-race coupler and a phase shifter, an attenuator, and a true time delay device, a residual SI signal is also frequency-selective due to the frequency selectivity of the phase shifter, attenuator, and true time delay device.

Figure 9:
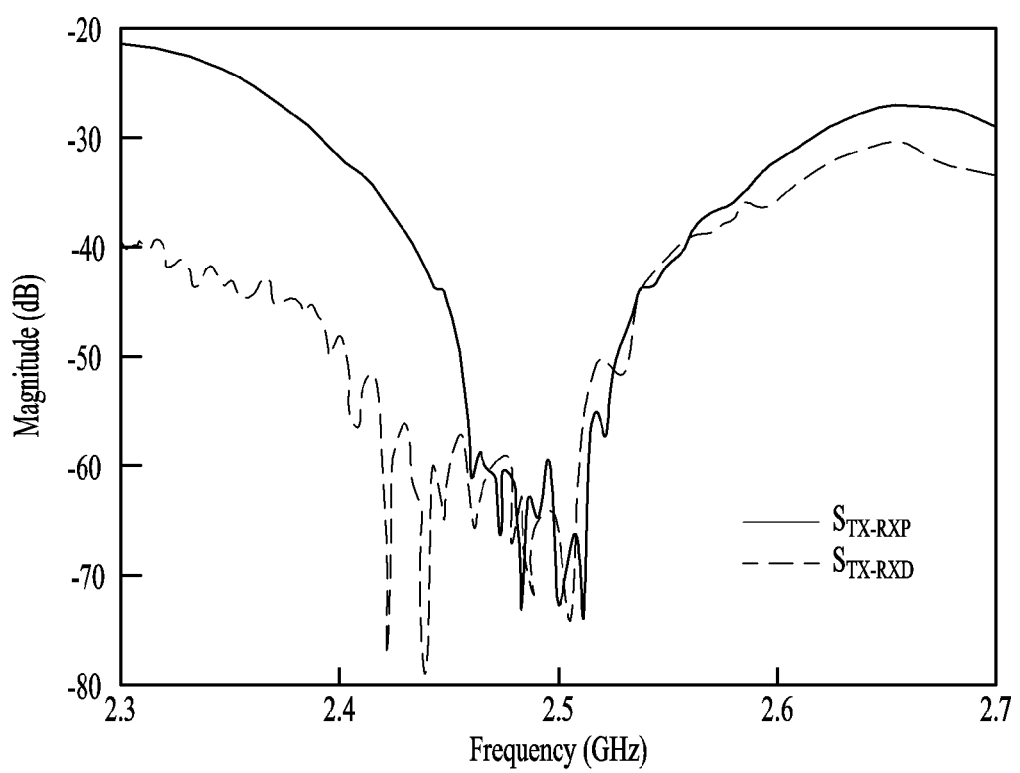
FIG. 9 is a view illustrating Self-IC levels after 1-transmission (1-Tx) and 2-reception (2-Rx) antenna Self-IC and analog Self-IC are performed using a rat race coupler.

FIG. 9 is a view illustrating Self-IC levels after 1-Tx and 2-Rx antenna Self-IC and analog Self-IC are performed using a rat-race coupler.

Referring to FIG. 9, since the performance of analog Self-IC corresponding to a bandwidth of 80 MHz is not frequency-flat, residual SI produced after antenna/analog Self-IC is also frequency-selective and a maximum difference of 15 dB occurs according to frequency bands. This causes the degradation of digital Self-IC as observed from the above Balun cases.

It may be concluded based on the above various examples that the performance of digital Self-IC is affected by the characteristics of residual SI produced after antenna/analog Self-IC, and to relieve the performance degradation, digital Self-IC needs to be designed according to the characteristics of antenna/analog Self-IC. More specifically, it is necessary to design digital Self-IC according to the characteristics of antenna/analog Self-IC in an FDR environment.

Figure 10:
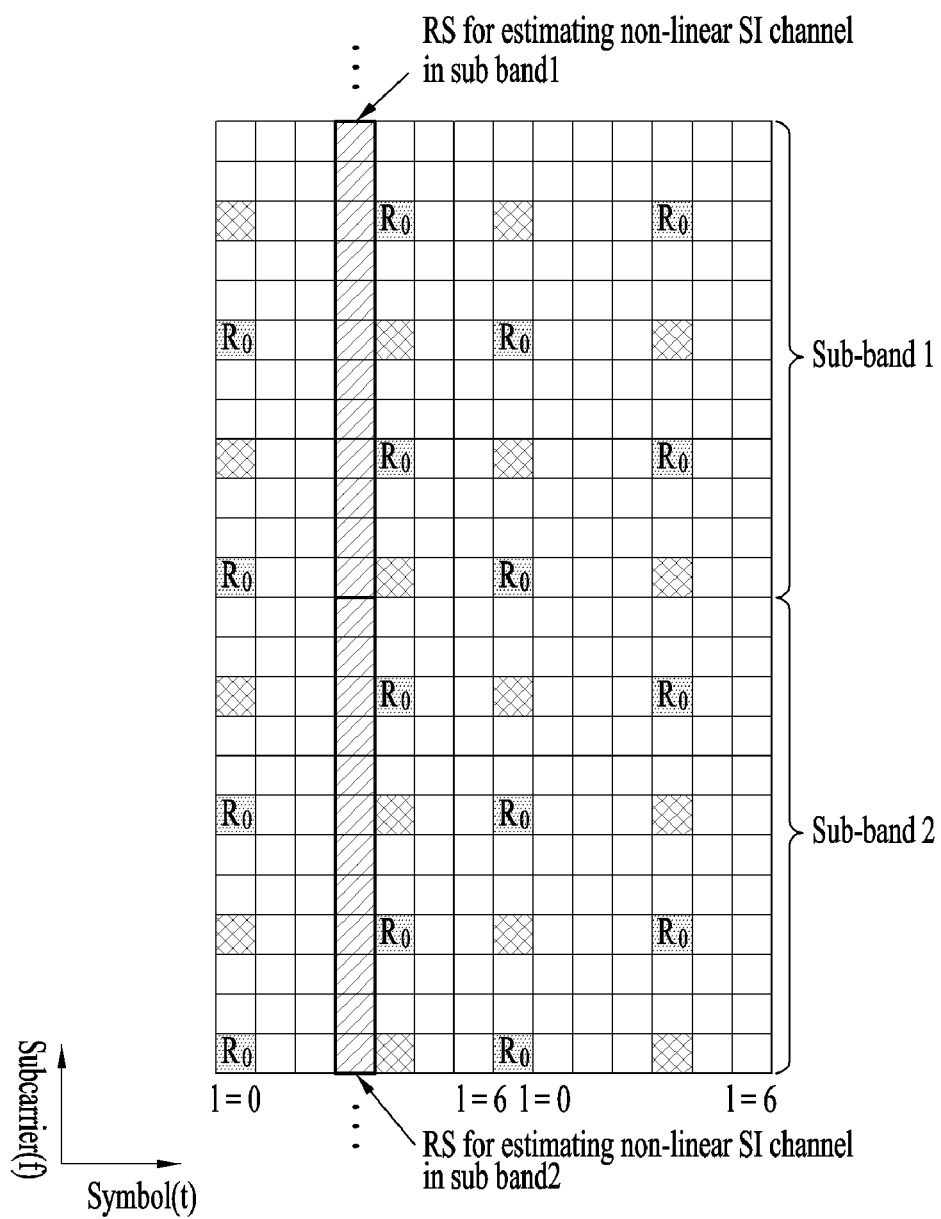
FIG. 10 is a view illustrating an exemplary reference signal (RS) allocation for subband-wise non-linear SI channel estimation.

FIG. 10 is a view illustrating an exemplary RS allocation for subband-wise non-linear SI channel estimation.

For example, as illustrated in FIG. 10, RSs for estimating non-linear SI channel estimation may be arranged on a subband basis, while the basic structure of a 3GPP LTE/LTE-A downlink frame is maintained. For example, in FIG. 10, RSs for estimating a non-linear SI channel may be allocated and mapped to a symbol corresponding to symbol index 1=4 (i.e., a fourth symbol) in a first slot on a subband basis (e.g., in each of subband 1 and subband 2). An FDR apparatus may estimate a non-linear SI channel on a subband basis by transmitting RSs for estimating a non-linear SI channel on a subband basis as illustrated in FIG. 10. Further, RSs may be mapped in a different manner from that of FIG. 10 according to a non-linear estimation order.

Figure 11:
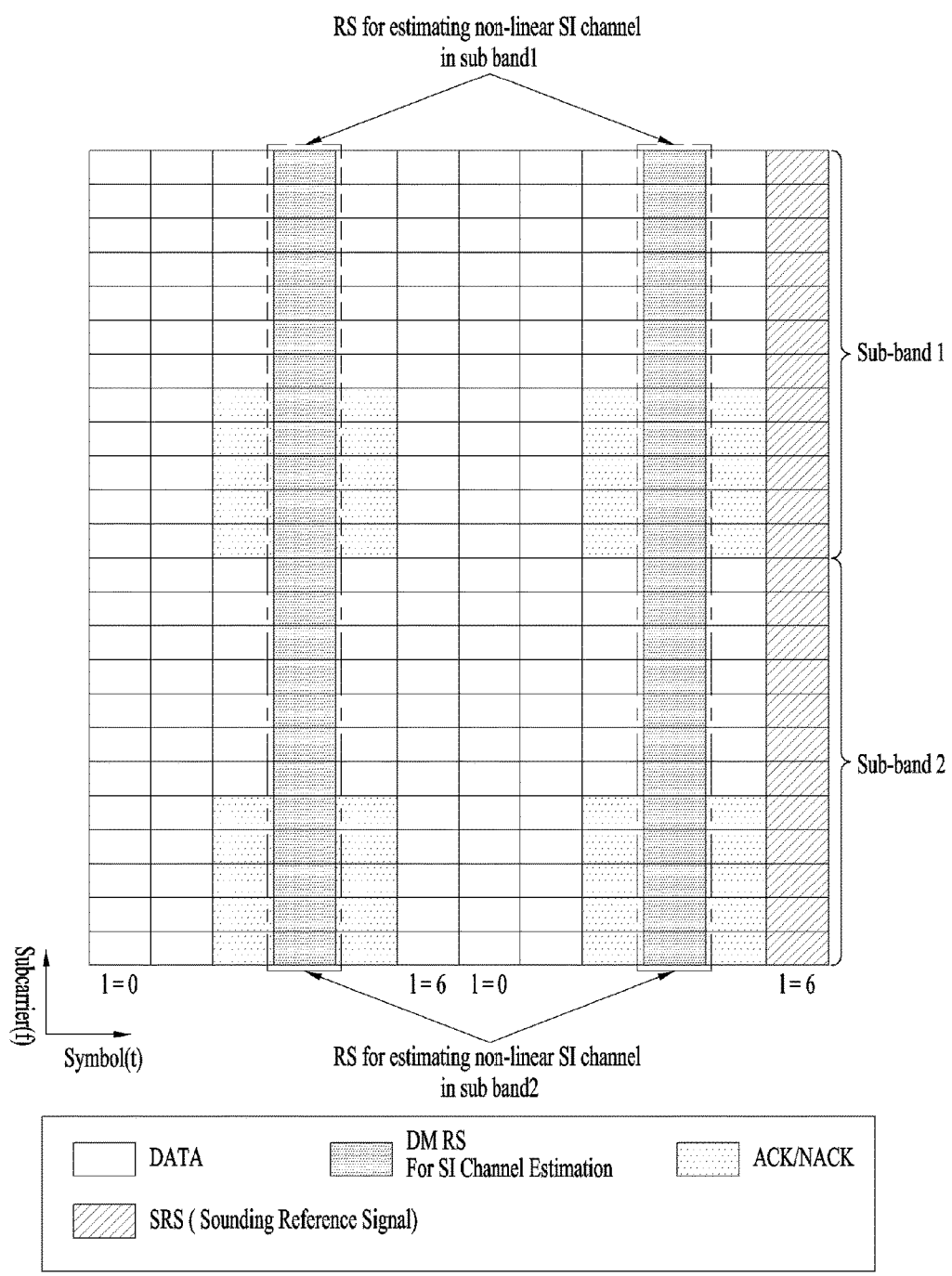
FIG. 11 is a view illustrating another exemplary RS allocation for subband-wise non-linear SI channel estimation.

FIG. 11 is a view illustrating another exemplary RS allocation for subband-wise non-linear SI channel estimation.

As illustrated in FIG. 11, RSs for estimating non-linear SI channel estimation (e.g., herein, RSs for non-linear SI channel estimation, designed in a DM RS symbol) may be arranged on a subband basis, while the basic structure of a 3GPP LTE/LTE-A uplink frame is maintained. For example, in FIG. 11, RSs for estimating a non-linear SI channel may be allocated and mapped to a symbol corresponding to symbol index 1=4 in first and second slots on a subband basis (e.g., in each of subband 1 and subband 2).

Further, RSs may be mapped in a different manner from that of FIG. 11 according to a non-linear estimation order.

Accordingly, in the present disclosure, a variation in the power level of a residual SI signal according to the performance of analog Self-IC is measured or estimated, and thus the order of a non-linear SI component to be considered for digital Self-IC should be determined. As described before, after antenna/analog Self-IC, the power level of the residual SI signal is changed according to a frequency, and there is a need for designing an RS for estimating a channel of the residual SI signal according to this frequency-selective frequency response, differently for each band.

Proposal 1

After antenna/analog Self-IC, the instantaneous power of a residual SI signal may be measured in each subband, a total bandwidth may be divided into a plurality of subbands based on the power measurements, and non-linear SI channel estimation of a different order may be performed in each of the subbands.

As described before, the performance of antenna/analog Self-IC varies with frequency bands. In relation to this, a per-frequency residual SI signal needs to be measured, first of all. To measure a residual SI signal which has been subjected to instantaneous antenna/analog Self-IC in each frequency, an error vector magnitude (EVM) or channel estimation may be used. The EVM will be described below.

Figure 12:
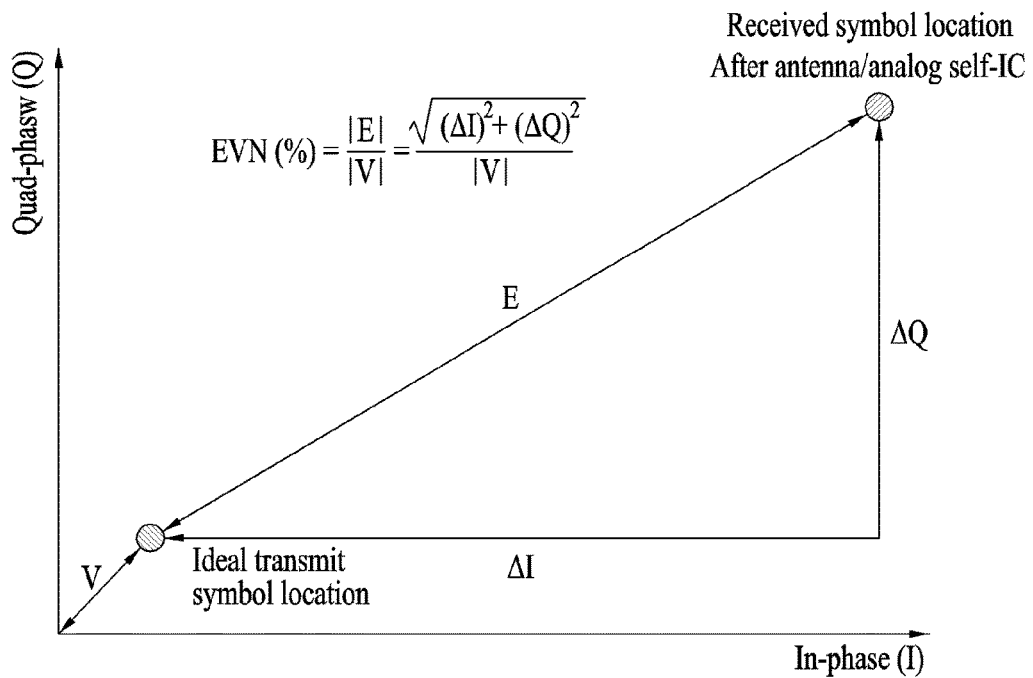
FIG. 12 is a view illustrating an exemplary error vector magnitude (EVM) in consideration of a residual SI signal.

FIG. 12 is a view illustrating an exemplary EVM in consideration of a residual SI signal.

An EVM is a value obtained by dividing the vector difference between a Tx signal and an Rx signal by the vector of the Tx signal. An exemplary EVM calculated in consideration of the power of an SI signal is illustrated in FIG. 12.

Since a Tx signal is known in the FDR system, the EVM of a signal received in the digital domain may be calculated. Since the power level of the Rx signal is larger than that of the Tx signal by tens of dB or above, the amounts of per-frequency residual SI signals may be compared with each other even though there is a slight error in the value of the Rx signal.

Another method for measuring the amount of a residual SI signal in each Rx signal is to use channel estimation. An effective channel including antenna/analog Self-IC may be estimated based on an RS as a Tx signal ($\tilde{h}_{SI,k}^{ord}(n)=\tilde{h}_{SI,k}(n)-\hat{h}_{SI,k}^{ord}(n)$, $\tilde{h}_{SI,k}^{aux}(n)=\tilde{h}_{SI,k}(n)-\hat{h}_{SI,k}^{aux}(n)$) and the absolute amount of a residual SI signal may be measured based on the effective channel.

The magnitude of an SI signal in each subband may be measured and used in a method other than selection and various combinations of the above methods.

For the above-described subband-wise SI signal measurement, a new block may be added to the OFDM-based block diagram of FIG. 5.

Figure 13:
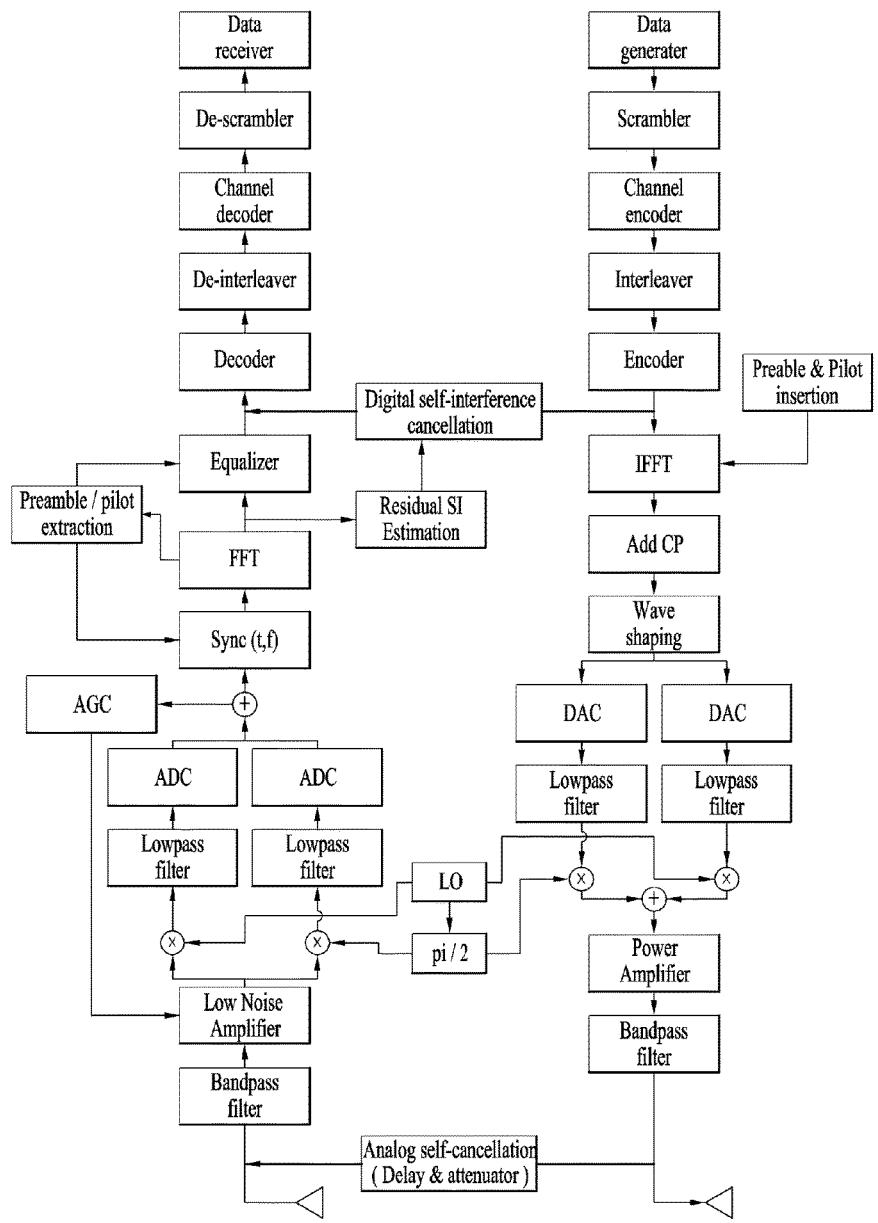
FIG. 13 is a new block diagram with an SI signal measuring block added to the block diagram illustrated in FIG. 5.

FIG. 13 is a new block diagram with an SI signal measuring block added to the block diagram illustrated in FIG. 5.

A residual SI signal estimation block of FIG. 13 may estimate a residual SI signal in various methods available for estimation of the residual SI signal, and provide the estimated information to a digital Self-IC block, for RS estimation. The order of a non-linear SI signal (or signal component) to be considered for each subband may be determined based on the power level of a residual SI signal measured in the subband, and the channel of the residual SI signal may be estimated in consideration of a different order in each subband. Now, a description will be given of an exemplary channel estimation of a residual SI signal in each subband based on the above description.

Embodiment 1 of Proposal 1

A total bandwidth may be divided into a plurality of subbands each having the same bandwidth, and a non-linear SI channel of a different order may be estimated for each subband. For example, the FDR system may perform non-linear digital Self-IC by dividing a total bandwidth of the system into two, three or a larger integer number of subbands each having the same bandwidth based on the power of a residual SI signal measured in each subband in the above-described manner, and producing a replica SI signal using channel information measured in the subbands.

Figure 14:
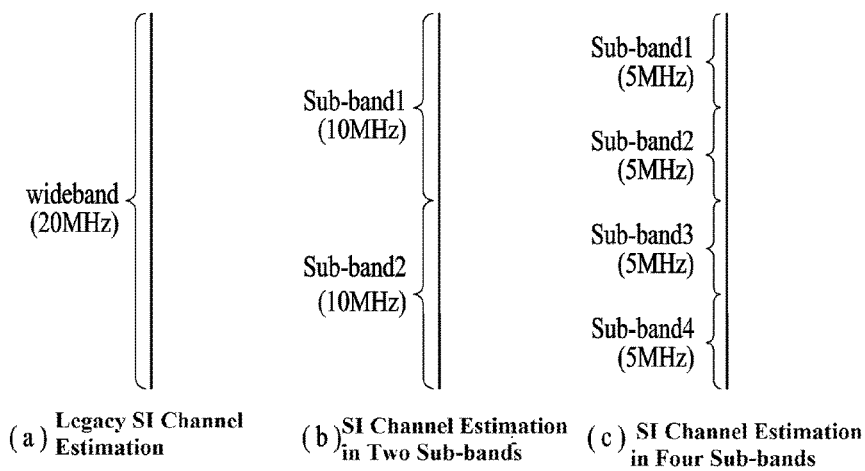
FIG. 14 is a view illustrating exemplary SI channel estimation in each of two or four subbands each having the same bandwidth, divided from a total bandwidth of 20 MHz.

FIG. 14 is a view illustrating exemplary SI channel estimation in each of two or four subbands each having the same bandwidth, divided from a total bandwidth of 20 MHz.

For example, if it is assumed that up to a third order should be considered for subband 1 and up to a fifth order should be considered for subband 2 as a result of dividing a total bandwidth into the two subbands each having a bandwidth of 10 MHz and estimating the power values of a residual SI signal channel in the two subbands as illustrated in (b) of FIG. 14, an SI signal may be estimated in each subband by transmitting an RS in the subband according to an estimated order for the subband.

In another example, if it is assumed that up to a third order should be considered for subband 1, up to a fifth order should be considered for subband 2, up to the third order should be considered for subband 3, and up to the third order should be considered for subband 4, as a result of dividing a total bandwidth into the four subbands each having a bandwidth of 5 MHz and estimating the power values of a residual SI signal channel in the four subbands as illustrated in (c) of FIG. 14, an SI signal may be estimated for each subband by transmitting an RS in the subband according to an estimated order for the subband.

In the above examples, specific values are taken as an example, for description. The present disclosure may be extended to SI channel estimation of various orders in various numbers of subbands based on the above examples.

Embodiment 2 of Proposal 1

A total bandwidth may be divided into a plurality of subbands having various bandwidths and a non-linear SI channel of a different order may be estimated on a subband basis.

For example, the FDR system may perform non-linear digital Self-IC by dividing a total bandwidth of the system into two, three or a larger integer number of subbands having various bandwidths based on the power of a residual SI signal measured in each subband in the above-described manner, and producing a replica SI signal using channel information measured in the subbands.

Figure 15:
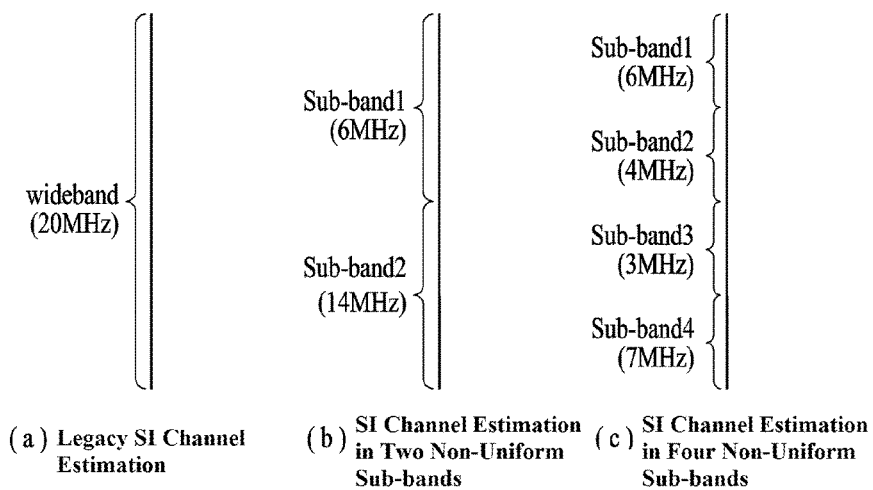
FIG. 15 is a view illustrating exemplary SI channel estimation in each of two or four subbands having different bandwidths, divided from a total bandwidth of 20 MHz.

FIG. 15 is a view illustrating exemplary SI channel estimation in each of two or four subbands having different bandwidths, divided from a total bandwidth of 20 MHz.

For example, if it is assumed that up to a third order should be considered for subband 1 having a bandwidth of 6 MHz and up to a fifth order should be considered for subband 2 having a bandwidth of 14 MHz as a result of dividing a total bandwidth into the two subbands having the bandwidths of 6 MHz and 14 MHz, respectively and estimating the power values of a residual SI signal channel in the two subbands as illustrated in (b) of FIG. 15, an SI signal may be estimated in each subband by transmitting an RS in the subband according to an estimated order for the subband.

In another example, if it is assumed that up to a third order should be considered for subband 1 having a bandwidth of 6 MHz, up to a fifth order should be considered for subband 2 having a bandwidth of 4 MHz, up to the third order should be considered for subband 3 having a bandwidth of 3 MHz, and up to the third order should be considered for subband 4 having a bandwidth of 7 MHz, as a result of dividing a total bandwidth into the four subbands having the bandwidths of 6 MHz, 4 MHz, 3 MHz, and 7 MHz, respectively and estimating the power values of a residual SI signal channel in the four subbands as illustrated in (c) of FIG. 15, an SI signal may be estimated for each subband by transmitting an RS in the subband according to an estimated order for the subband.

In the above examples, specific values are taken as an example, for description. The present disclosure may be extended to SI channel estimation of various orders in various numbers of subbands having various bandwidths based on the above examples.

Proposal 2

The number of subbands may be determined using a measurement of a residual SI signal in order to reduce the complexity of SI channel estimation.

The proposed method is to estimate a non-linear SI channel of a different order in each subband in order to reflect the frequency selectivity of a residual SI signal. Herein, as the number of subbands increases, a replica signal may be produced by reflecting the frequency selectivity of a residual SI signal more accurately, thus increasing the performance of non-linear digital Self-IC. However, the increased number of subbands also leads to an increase in the signaling overhead and complexity of transmitting the resulting RS resource allocation information to another BS or a UE. Accordingly, there is a need for changing the number of subbands according to the frequency selectivity of a measured residual SI signal in consideration of complexity.

A criterion is required for a BS and a UE operating in FDR to determine the number of subbands based on a residual SI signal measured as described above. That is, a criterion is needed to determine the number of subbands in which a non-linear SI channel should be estimated based on the measured power of a residual SI signal on a subband basis, and to determine an order up to which the non-linear SI channel estimation should be performed for each subchannel.

In the present disclosure, the criterion may be set in the following various methods.

Embodiment 1 of Proposal 2

The number of subbands may be determined based on the absolute values of residual SI signal measurements. The orders of non-linear SI channels to be measured according to measured residual SI signals may be preset in a table and the number of subbands may be determined based on the absolute values.

The following [Table 2] is an exemplary table listing the orders of non-linear SI signals to be considered for non-linear SI channel estimation based on power measurements of residual SI signals. [Table 2] describes a relationship between the measured power values of residual SI signals and orders considered for non-linear SI channel estimation.

TABLE 2

| Measured power of residual SI ($P_{SI}$) | Order considered for non-linear SI channel estimation |
| --- | --- |
| $P_{SI}$ < −80 dBm | Linear Only |
| −80 dBm ≤ $P_{SI}$ < −70 dBm | Linear + $3^{rd}$ order |

TABLE 2-continued

| Measured power of residual SI ($P_{SI}$) | Order considered for non-linear SI channel estimation |
| --- | --- |
| −70 dBm ≤ $P_{SI}$ < −60 dBm | Linear + $3^{rd}$ order + $5^{th}$ order |
| −60 dBm ≤ $P_{SI}$ ≤ −50 dBm | Linear + $3^{rd}$ order + $5^{th}$ order + $7^{th}$ order |

An example of dividing a total bandwidth into subbands based on the absolute values of residual SI signal power measurements, referring to [Table 2] will be described below.

Figure 16:
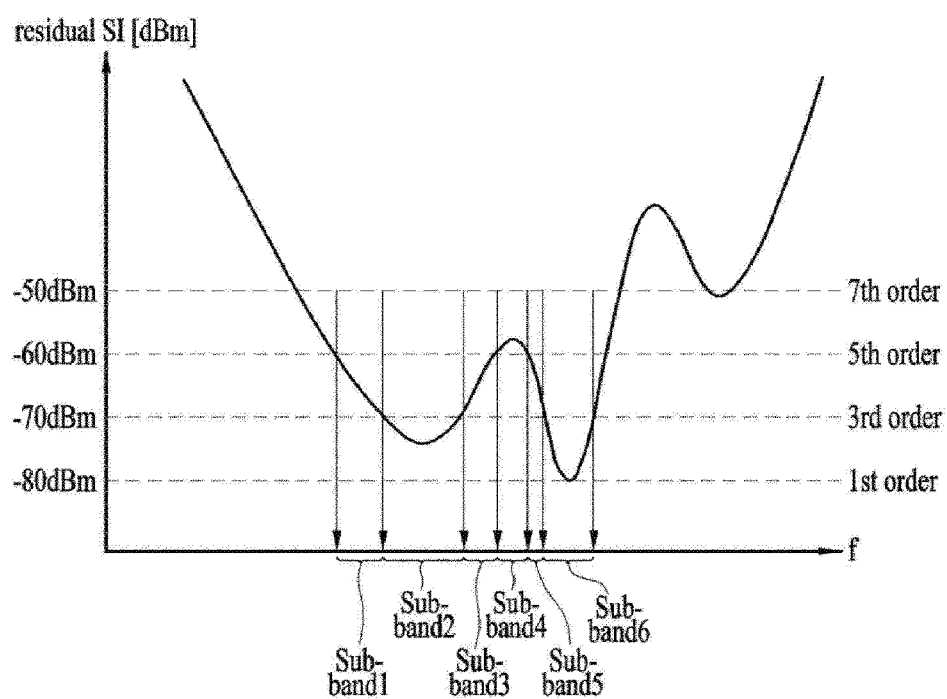
FIG. 16 is a view illustrating an exemplary determination of the number and orders of subbands based on absolute value of a residual SI signal measurement.

FIG. 16 is a view illustrating an exemplary determination of the number and orders of subbands based on the absolute values of residual SI signal measurements.

As illustrated in FIG. 16, subbands may be defined based on residual SI signal measurements, and the channels of a residual SI signal may be estimated according to orders based on setting values in a predetermined table. The following orders should be estimated for respective subbands. Up to the $5^{th}$ order of a residual signal may be estimated in subband 1, subband 3, and subband 5, up to the $3^{rd}$ order of the residual signal may be estimated in subband 2 and subband 6, and up to the $7^{rd}$ order of the residual signal may be estimated in subband 4.

The above case is a mere example, and the setting values of [Table 2] may vary according to the transmission power of the FDR system, an SI channel environment, and the performance of antenna/analog Self-IC.

Embodiment 2 of Proposal 2

The number of subbands may be determined based on the absolute values of residual SI signal measurements and margins.

In Embodiment 1 of Proposal 2, since subbands are defined based on the absolute values of residual SI signal measurements, a total bandwidth is frequently divided into subbands and channel estimation of a different order is performed for each subband. However, Embodiment 1 of Proposal 2 requires signaling to allocate an RS to each subband as described before, thereby increasing feedback overhead. To reduce the feedback overhead, the number of defined subbands needs to be reduced using margins in addition to the absolute values of residual SI signal measurements. That is, Embodiment 2 of Proposal 2 proposes that the orders of non-linear SI channels to be measured according to residual SI signal measurements and margins are preset in a table and subbands are determined based on these values. Herein, the margins may be fixed values or may have various values in each period.

[Table 3] below illustrates a relationship between residual SI signal power measurements and margins, and orders considered for non-linear SI channel estimation. In the case where margins are set to 5 dB or below ($\alpha_{margin,i} \leq 5$ dB) the orders of non-linear SI signals to be considered for non-linear SI channel estimation based on residual SI signal power measurements are shown in [Table 3], by way of example.

TABLE 3

| Measured power of residual SI ($P_{SI} + \alpha_{margin,i}$) | Order considered for non-linear SI channel estimation |
| --- | --- |
| $P_{SI}$ < −80 dBm + $\alpha_{magin,1}$ | Linear Only |
| −80 dBm + $\alpha_{magin,1}$ ≤ $P_{SI}$ < −70 dBm + $\alpha_{magin,2}$ | Linear + $3^{rd}$ order |

TABLE 3-continued

| Measured power of residual SI ($P_{SI} + \alpha_{magin,i}$) | Order considered for non-linear SI channel estimation |
|---|---|
| $-70$ dBm $+ \alpha_{magin,2} \leq P_{SI} < -60$ dBm $+ \alpha_{magin,3}$ | Linear $+ 3^{rd}$ order $+ 5^{th}$ order |
| $-60$ dBm $+ \alpha_{magin,3} \leq P_{SI} \leq -50$ dBm $+ \alpha_{magin,4}$ | Linear $+ 3^{rd}$ order $+ 5^{th}$ order $+ 7^{th}$ order |

In the case where subbands are defined based on the absolute values of residual SI power measurements+margins based on [Table 3], the following may be described as an example. In the following example, only $\alpha_{margin,3}=5$ dB ($\alpha_{margin,1}=0$, $\alpha_{margin,2}=0$, $\alpha_{margin,4}=0$) rather than margins are given to all references.

Figure 17:
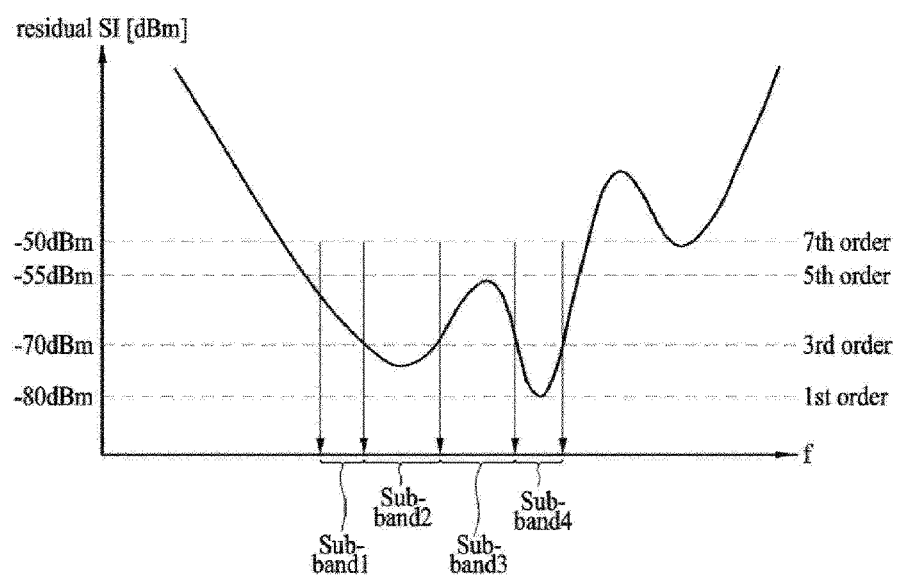
FIG. 17 is a view illustrating another exemplary determination of the number and orders of subbands based on a relative value of a residual SI signal measurement.

FIG. 17 is a view illustrating another exemplary determination of the number and orders of subbands based on relative values of residual SI signal measurements.

The use of too many margins leads to the degradation of the performance of residual SI channel estimation. While channel estimation is performed on a residual SI signal of a $5^{th}$ order in a period with $-60$ dBm$\leq P_{SI}$(residual SI signal power)$<-55$ dBm in the case of using existing absolute values, channel estimation is performed only on a residual SI signal of a $3^{rd}$ order in the period with $60$ dBm$\leq P_{SI}<-55$ dBm due to $\alpha_{margin,3}=5$ dB. Herein, the margin may be negative-signed in order to increase the performance of residual SI channel estimation.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for performing Self-IC in a communication apparatus using FDR may be used industrially in various wireless communication systems including a 3GPP LTE-A system and a 5G communication system.

The invention claimed is:

1. A method for performing self-interference cancellation by a communication apparatus using a full duplex radio (FDR) scheme, the method comprising:
measuring a strength of a residual self-interference signal after antenna and analog self-interference cancellations, in each of a number of subbands;
determining a maximum order of a non-linear self-interference signal component of the residual self-interference signal, to be considered for channel estimation of the residual self-interference signal in each subband, based on the measured strength of the residual self-interference signal in each subband; and
performing channel estimation on the residual self-interference signal for each subband based on to the maximum order determined per each subband.

2. The method according to claim 1, wherein the maximum order determined for each subband is different from each other.

3. The method according to claim 1, wherein each subband has different bandwidths.

4. The method according to claim 1, wherein each subband has a same bandwidth.

5. The method according to claim 1, wherein the number of subbands is determined based on frequency selectivity of the residual self-interference signal.

6. The method according to claim 1, wherein the number of subbands is determined based on an absolute value of the strength of the residual self-interference signal after the antenna self-interference cancellation and the analog self-interference cancellation.

7. The method according to claim 1, wherein the number of subbands is determined based on:
an absolute value of the strength of the residual self-interference signal after the antenna self-interference cancellation and the analog self-interference cancellation; and
a predetermined margin value for the strength of the residual self-interference signal.

8. A communication apparatus for performing self-interference cancellation in a full duplex radio (FDR) environment, the communication apparatus comprising:
a processor that:
measures the strength of a residual self-interference signal after antenna and analog self-interference cancellations, in each of a number of subbands;
determines a maximum order of a non-linear self-interference signal component of the residual self-interference signal, to be considered for channel estimation of the residual self-interference signal in each subband, based on the measured strength of the residual self-interference signal measured in each subband; and
performs channel estimation on the residual self-interference signal for each subband based on the maximum order determined per each subband.

9. The communication apparatus according to claim 8, wherein the processor further determines the number of subbands based on frequency selectivity of the residual self-interference signal.

10. The communication apparatus according to claim 8, wherein the processor further determines the number of subbands based on an absolute value of the strength of the residual self-interference signal after the antenna self-interference cancellation and the analog self-interference cancellation.

11. The communication apparatus according to claim 8, wherein the processor further determines the number of subbands based on an absolute value of the strength of the residual self-interference signal after the antenna and analog self-interference cancellations and a predetermined margin value for the strength of the residual self-interference signal.

12. The method according to claim 1, wherein the maximum order is odd order.

13. The method according to claim 1, wherein the strength of the residual self-interference signal comprises a power strength of the residual self-interference signal.

* * * * *